(12) United States Patent
Hayes et al.

(10) Patent No.: US 12,202,485 B2
(45) Date of Patent: Jan. 21, 2025

(54) VEHICLE MONITORING SYSTEM

(71) Applicant: RM ACQUISITION, LLC, Boise, ID (US)

(72) Inventors: Thomas J Hayes, Lakewood, OH (US); Michael D Cremona, Lakewood, OH (US); Steven C Schapel, Akron, OH (US); Daniel P Zula, North Ridgeville, OH (US); Nianqing Zhou, Avon, OH (US)

(73) Assignee: RM ACQUISITION, LLC, Boise, ID (US)

( * ) Notice: Subject to any disclaimer, the term of this patent is extended or adjusted under 35 U.S.C. 154(b) by 838 days.

(21) Appl. No.: 17/336,635

(22) Filed: Jun. 2, 2021

(65) Prior Publication Data

US 2022/0388512 A1 Dec. 8, 2022

(51) Int. Cl.
*B60W 50/14* (2020.01)
*B60W 30/18* (2012.01)
*B60W 40/09* (2012.01)
*G08G 1/00* (2006.01)

(52) U.S. Cl.
CPC ...... *B60W 30/18109* (2013.01); *B60W 40/09* (2013.01); *B60W 50/14* (2013.01); *G08G 1/20* (2013.01); *B60W 2050/146* (2013.01); *B60W 2420/403* (2013.01); *B60W 2554/4048* (2020.02)

(58) Field of Classification Search
CPC .......... B60W 30/18109; B60W 40/09; B60W 50/14; B60W 2050/146; B60W 2420/403; B60W 2554/4048; B60W 2300/14; B60W 2510/30; B60W 2756/10; G08G 1/20; B60K 2360/178; B60K 2360/21; B60K 35/22; B60K 35/28; B60K 35/00; B60C 23/0406; B60Q 1/305; B60Q 11/00; B60Y 2200/147; G07C 5/0825; G06V 20/56
See application file for complete search history.

(56) References Cited

U.S. PATENT DOCUMENTS

| 6,400,262 | B2 | 6/2002 | Bigelow |
| 9,464,887 | B2 | 10/2016 | Salter |
| 10,818,106 | B2 | 10/2020 | Zula |

(Continued)

OTHER PUBLICATIONS

Hendrickson USA, LLC, "TIREMAAX Automatic Tire Pressure Control Systems," Advertising literature, Jan. 2020, 4 pages, Hendrickson USA LLC, United States of America.

(Continued)

*Primary Examiner* — Harry Y Oh
(74) *Attorney, Agent, or Firm* — MARSHALL, GERSTEIN & BORUN LLP

(57) ABSTRACT

A monitoring system for a combination vehicle comprises at least one image capture device mounted on a tractor, which has a trailer mounted control system within its field of view. The trailer mounted control system has a visual indicator. A controller is associated with the at least one image capture device. The controller captures images of the visual indicator, determines if the visual indicator meets a predetermined event condition and provides notification to at least one of a driver of the tractor and a remote fleet operator in response to the visual indicator meeting the predetermined condition.

13 Claims, 2 Drawing Sheets

(56) References Cited

U.S. PATENT DOCUMENTS

| | | | | |
|---|---|---|---|---|
| 2005/0128060 A1* | 6/2005 | Rennick | ............ | B60K 31/0008 |
| | | | | 340/693.9 |
| 2011/0043343 A1 | 2/2011 | Shepler | | |
| 2017/0171952 A1* | 6/2017 | Troutman | ............ | B60Q 11/005 |
| 2017/0340908 A1* | 11/2017 | Heath | .................... | A62C 37/44 |
| 2018/0293891 A1* | 10/2018 | Troutman | ................ | G08G 1/13 |
| 2021/0224971 A1* | 7/2021 | Levin | .................... | B60W 50/14 |

OTHER PUBLICATIONS

Utility Trailer Manufacturing Co. "Reefers," Advertising literature, 2020, 6 pages, Utility Trailer Manufacturing Co., City of Industry, California.

* cited by examiner

VEHICLE MONITORING SYSTEM

BACKGROUND

The present application relates to a system and method for monitoring for visual faults in a commercial vehicle.

Cameras are used in commercial vehicle systems to monitor the driving environment in and around the vehicle. They can be used to detect vehicles in a driver's blind spot, monitor the status of the driver while the vehicle is in motion and to maintain a safe following distance from a forward vehicle, for example.

Commercial tractors often tow trailers that have their own on board control systems. For example, a reefer trailer will have an automated cooling system. Some trailers have automated tire inflation systems. All trailers are required by law to have an anti-lock braking system. If there is a problem with any electronic system on the trailer, a warning light on the outside of the trailer will be illuminated. Since trailers and tractors have limited communication channels, the driver is responsible for looking at the trailer warning light status prior to departing and during driving to ensure that there are no warnings active. The driver has to use the rear view mirror to monitor for the warning lamps during vehicle operation.

Accordingly, those skilled in the art continue with research and development efforts in the field of vehicle monitoring to ensure that warnings in trailer systems are timely noticed and acted upon by a commercial vehicle operator.

SUMMARY

In accordance with one embodiment, a monitoring system for a combination vehicle comprises at least one image capture device mounted on a tractor, which has a trailer mounted control system within its field of view. The trailer mounted control system has a visual indicator. A controller is associated with the at least one image capture device. The controller captures images of the visual indicator, determines if the visual indicator meets a predetermined event condition and provides notification to at least one of a driver of the tractor, a remote fleet operator and a tractor control system in response to the visual indicator meeting the predetermined condition.

In accordance with another embodiment, a method for monitoring a vehicle comprises receiving a video signal through a tractor mounted image capture device of a visual indicator of a trailer mounted control system. The method determines a change occurred in the visual indicator and provides a notice to at least one of a driver of the vehicle, a remote fleet operator and a tractor control system in response to the change in the visual indicator.

DETAILED DESCRIPTION

Figure 1:
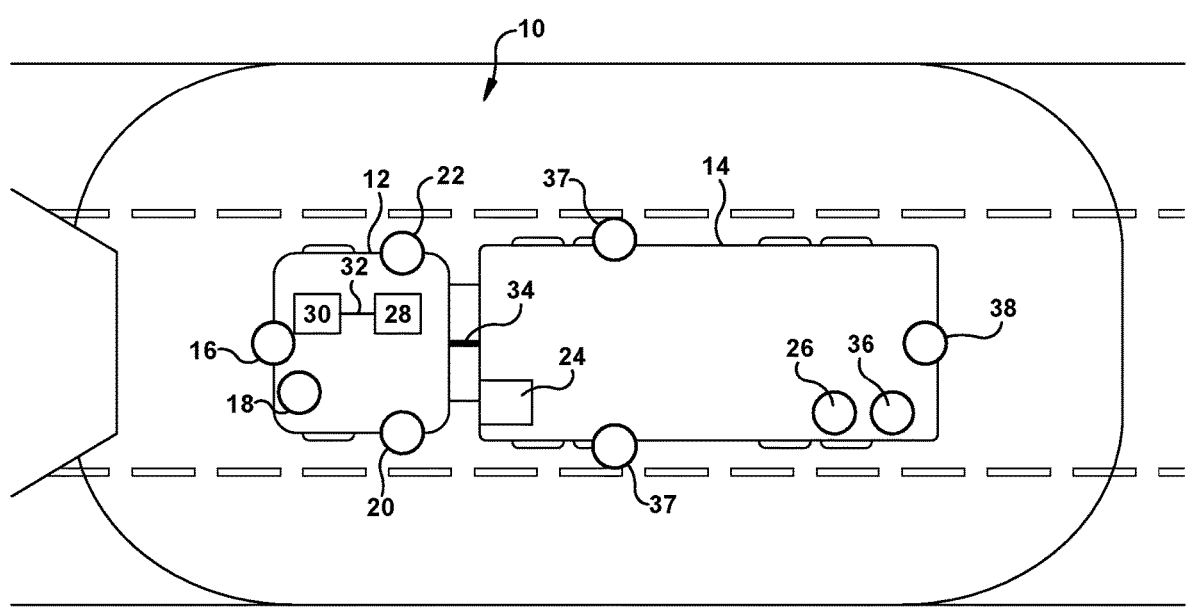
FIG. 1 is a representation of a commercial vehicle having a tractor and trailer.

Referring to FIG. 1, a vehicle monitoring system 10 for a commercial vehicle is shown. The commercial vehicle includes a tractor 12 and a trailer 14. The monitoring system 10 includes image capture devices, such as a front facing camera 16, a driver facing camera 18 and two side cameras 20, 22. The front facing camera 16 is used in collision avoidance and adaptive cruise control systems. The driver facing camera 18 is used to monitor the status of the driver during vehicle operation. The side camera 20 is used to monitor the blind spot on the driver's side of the tractor 12 and the side camera 22 is used to monitor the blind spot on the passenger's side of the tractor 12.

However, these cameras 16, 18, 20, 22 are also used in the vehicle monitoring system 10 because they have areas of the tractor 12 and trailer 14 in view that will assist the vehicle driver in safely maintaining and operating his commercial vehicle.

In one example the cameras 16, 18, 20, 22 are connected to a central camera controller 28. The video signals are transmitted to the camera controller 28 for processing. In another example, the cameras 16, 18, 20, 22 include their own separate controllers. The cameras 16, 18, 20, 22 would communicate via a vehicle communications bus 32 in that example.

A display 30 may be in the cab of the tractor 12. The display 30 communicates with the camera controller 28 and other tractor control systems over the vehicle communications bus 32. The vehicle communications bus 32 may use a standard protocol, such as SAE J1939.

The trailer 14 is mechanically and electrically connected to the tractor 12. The trailer 14 may be a refrigerated carrier and have a control system panel 24 on the front of the body of the trailer 14. The control system will light a lamp on the control panel 24 if there is an error in the refrigeration system. The control system may also blink the lamp on the control panel 24 to transmit a diagnostic code regarding the type of error. The control system may also change color of a lamp on the control panel 24, such as changing from a green color to a red color if there is an issue with the refrigeration system.

The trailer 14 may also be equipped with a tire inflation system. The tire inflation system includes a lamp 26 mounted near the rear of the trailer 14 that may be illuminated when there is an issue with the tire inflation system. The lamp 26 may come on each time the tire inflation system is engaged to inflate the tires. If the lamp is on frequently, there may be an issue with the tires or the tire inflation system itself.

The trailer 14 will be equipped with an anti-lock braking system (ABS). The antilock braking system has a warning lamp 36 mounted near the rear of the trailer 14. The warning lamp 36 is illuminated when there is an issue with the ABS.

Other control systems may be on the trailer and include their own warning and status lamps. The controller 28 can be programmed to identify operation of the control systems through the operation of the warning and status signals.

The trailer 14 may be equipped with a lift axle system 37. The lift axle is lowered when additional weight in the trailer is to be spread over the extra axle and lifted when the trailer is empty or when the vehicle is at slow speeds and cornering. The lift axle system 37 may be manually lifted or lowered. A vehicle monitoring system 10 can visually identify whether the lift axle system 37 is in a raised or lowered position.

The trailer 14 may have side opening doors, rear opening doors 38 or a combination of both. The vehicle monitoring system 10 can visually identify whether the doors are open based on their position in the frame of an image capture device The trailer 14 is attached to the tractor 12 via a tractor-trailer electrical connector 34. The connector 34 includes power and ground and generally does not include separate communications lines. Therefore, communication between the tractor 12 and trailer 14 uses power line carrier (PLC) technology, using the SAE J2497 protocol. PLC transmits information regarding the ABS on a trailer 14 via the power line so that a lamp in the cab is turned on or the display 18 is changed if there is an ABS error in the trailer 14. While the PLC is capable of communicating the status of other trailer systems, it is generally only enabled for turning on the warning lamp in the cab in response to an ABS error in order to fulfill federal regulations. Some advanced systems include controller area network systems using the protocol ISO 11992 between the tractor and trailer. Ethernet is also a possibility for communication. However, tractors equipped with one communication type may be connected to trailers having a different communication type, such that the tractor and the trailer may not be compatible.

The driver is responsible for monitoring all of the systems on the tractor 12 and trailer 14 to ensure proper operation of the vehicle, as part of a pre-trip inspection and during on the road travel. Therefore, the present vehicle monitoring system 10 will provide additional assistance to the driver in looking for issues in the operation of the trailer 14, as the system 10 automates the monitoring of changes in the lamps or other indicators on the trailer 14. This is important in autonomous and semi-autonomous tractors, as they may pull existing trailers that have these visual warning systems without a means to fully communicate with the tractor.

The camera controller 28 includes a memory preprogrammed or available to be programmed with information regarding system indicators and their operation. For example, the camera controller 28 is programmed to recognize that the ABS warning lamp 36 is only turned on when there is an issue with the ABS on the trailer 14. Therefore, when the ABS warning lamp 36 is on, then the driver must be notified. The camera controller 28 may also be programmed with the type of corrective action that is necessary when the vehicle condition is met. The controller 28 will communicate with the driver via the display 30 to inform him how to correct the issue found by the vehicle monitoring system 10.

The camera controller 28 may include additional communication capability, such that the controller 28 can communicate with an off-vehicle server. The off-vehicle server can store the information regarding the issues identified by the vehicle monitoring system 10. The time and date of when the issue occurred can be stored locally or remotely. A remote fleet operator may monitor the server to determine when maintenance may be needed on a trailer. Alternatively, the camera controller 28 itself can transmit a request for necessary maintenance based on the identification of the visual indicator meeting the predetermined condition. Other tractor control systems may receive the request via the communications bus 32.

Therefore, a monitoring system for a combination vehicle comprises at least one image capture device mounted on a tractor, which has a trailer mounted control system within its field of view. The trailer mounted control system has a visual indicator. A controller is associated with the at least one image capture device. The controller captures images of the visual indicator, determines if the visual indicator meets a predetermined event condition and provides notification to at least one of a driver of the tractor, a remote fleet operator and a tractor control system in response to the visual indicator meeting the predetermined condition.

Figure 2:
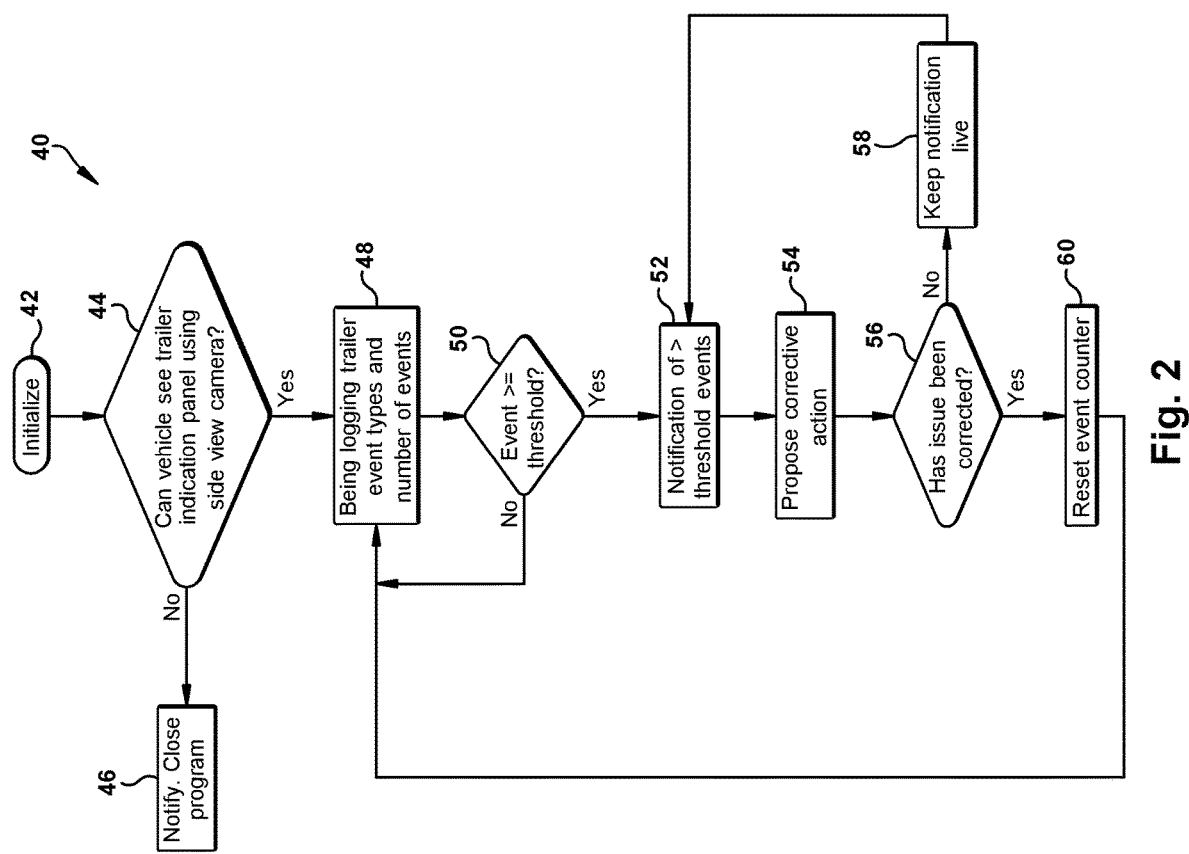
FIG. 2 is a method of monitoring the vehicle, according to one example of the invention.

FIG. 2 shows a method 40 of identifying events on a trailer using a tractor mounted camera, for example side camera 20 or side camera 22. In step 42, the method 40 is initialized. In step 44, the camera controller 28 determines whether side camera 20 or side camera 22 can see the control system panel 24, trailer warning lamps 26 associated with tire inflation, ABS warning lamp 36 or other systems' indicators or position. In the instance of a cab only tractor having a rear window, the driver facing camera 18 may have the control system panel 24 in its view. If the camera controller 28 determines that the cameras 18, 20, 22 do not see any indicators, for example, the side camera 20 or side camera 22 are not positioned to include the portion of the trailer 14 having the indicators in their view, the method 40 moves to step 46 where the driver is informed that no additional information can be shared about the state of the warning systems. The driver may be informed via a message on the display 30. Alternatively, the notification can be to the remote fleet operator or to other systems on the vehicle itself. The method 40 is stopped. The method 40 may be re-run on each start up of the tractor 12 in case the camera positioning has been changed.

If the camera controller 28 determines that at least one indicator or position of trailer equipment is visible in the field of view of at least one camera 18, 20, 22, the method 40 continues to step 48.

In step 48, the controller 28 begins to log the status of the indicators. In some instances, having the indicator on means the system is working and in other systems having the indicator on means the system is not working properly. The camera controller 28 will begin logging the status of the indicators for comparison with the preprogrammed information regarding operation of the indicators.

In step 50, the camera controller 28 determines if the number and frequency of changes to the monitored indicators exceed a threshold. The threshold events can be preprogrammed in the camera controller 28 as in some instances, one change to the lamp can require immediate attention whereas in other systems, the change to the indicator indicates the attention necessary. For example, the threshold for an ABS warning lamp to be on is simply one, as anytime the ABS warning lamp is on, the driver must be notified. However, the tire inflation system may blink its lamp 26 while an inflation event is occurring but if the lamp 26 is on frequently, it may mean there is an issue with the tire. The vehicle monitoring system 10 can also recognize a color change in a visual indicator, such as green meaning the system is okay and red meaning that there is an error. The vehicle monitoring system 10 can also identify the position of trailer equipment such as the lift axle and the access doors. If the events do not exceed the threshold or meet the predetermined condition, the method 40 returns to step 48 to continue to collect events.

If the events are equal to or greater than the threshold established in the camera controller 28, the method 40 continues to step 52. In step 52, the driver is notified of the potential issue with one of the trailer systems as the camera controller 28 communicates through the display device 30. In another example, the remote fleet operator may be notified of the issue through communication with the off-vehicle server. The electronics on the tractor itself could receive notice of the potential issue, especially for autonomous and semi-autonomous vehicles.

In step 54, the system 10 may propose the corrective action through the display 30. The driver may need to stop the vehicle and adjust a setting on the refrigerated trailer cooling system, for example. The driver may need to call for maintenance to be ready for him at the next scheduled stop, the system 10 may arrange for maintenance automatically or the driver may need to stop the vehicle immediately.

In step 56, the system 10 determines whether the issue has been corrected by monitoring the indicators. If the issue has not been corrected, the notification to the driver is kept live in step 58. The method 40 returns to step 52 to continue to notify the driver of the issue.

In one example, the camera controller 28 may communicate with other vehicle systems, such as the engine via the communications bus 32 to set a torque limit to keep the vehicle speed low until the error is corrected. The display 28 may be used to indicate that a driver should avoid a certain road or traveling at expressway speeds until the error is corrected. The fleet operator may manage all of these actions remotely.

If the issue was corrected and no further action is needed, the event counter is reset in step 60 and the method 40 returns to step 48 to continue to monitor the indicators.

Therefore, a method for monitoring a vehicle comprises receiving a video signal through a tractor mounted image capture device of a visual indicator of a trailer mounted control system. The method determines a change occurred in the visual indicator and provides a notice to at least one of a driver of the vehicle and a remote fleet operator in response to the change in the visual indicator.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A monitoring system for a combination vehicle having a tractor and a trailer coupled to the tractor, comprising:
   at least one image capture device mounted on the tractor, having a trailer mounted control system within its field of view when the trailer is coupled to the tractor, the trailer mounted control system having a visual indicator; and
   a controller associated with the at least one image capture device;
   wherein the controller:
      captures images of the visual indicator;
      determines if the visual indicator meets a predetermined event condition; and
      provides notification to at least one of a driver of the tractor, a remote fleet operator and a tractor control system in response to the visual indicator meeting the predetermined condition.

2. The monitoring system as in claim 1, wherein the trailer mounted control system is an antilock braking system and determining if the visual indicator meets a predetermined condition comprises identifying the visual indicator associated with the antilock braking system is a light being on.

3. The monitoring system as in claim 1, wherein the trailer mounted control system is a refrigeration system and determining if the visual indicator meets a predetermined condition comprises identifying that the visual indicator associated with the refrigeration system is a light that has changed colors.

4. The monitoring system as in claim 1, wherein the trailer mounted control system is a tire inflation system and determining if the visual indicator meets a predetermined condition comprises identifying that the frequency of a light being on has increased.

5. The monitoring system as in claim 1, wherein the trailer mounted control system is a rear door latching system and determining if the visual indicator meets a predetermined condition comprises identifying that the door is open within the field of view.

6. The monitoring system as in claim 1, wherein the trailer mounted control system is a lift axle and determining if the visual indicator meets a predetermined condition comprising identifying that the wheels of the lift axle are in contact with the ground.

7. The monitoring system as in claim 1, further comprising the controller providing a corrective action to be acted upon in response to the visual indicator meeting the predetermined condition.

8. The monitoring system as in claim 1, wherein the controller further records the time the visual indicator met the predetermined condition.

9. The monitoring system as in claim 1, wherein the controller further transmits a request to a maintenance location and informs the driver of the location for maintenance.

10. A method for monitoring a vehicle having a tractor and a trailer, comprising:
    receiving a video signal through a tractor mounted image capture device of a visual indicator of a trailer mounted control system when the trailer is coupled to the tractor;
    determining if a change has occurred in the visual indicator; and
    providing a notice to at least one of a driver of the vehicle, a remote fleet operator and a tractor control system in response to the change in the visual indicator.

11. The method as in claim 10, further comprising providing a corrective action to be acted upon in response to the change in the visual indicator.

12. The method as in claim 10, further comprising transmitting a request to a maintenance location and informing the driver of the maintenance location.

13. The method as in claim 10, further comprising recording the time the visual indicator changes condition.

* * * * *